(12) United States Patent
Luckay et al.

(10) Patent No.: US 12,547,908 B2
(45) Date of Patent: Feb. 10, 2026

(54) DETERMINING AND EXECUTING PROACTIVE DELIVERY ACTIONS USING ARTIFICIAL INTELLIGENCE

(71) Applicant: UNITED STATES POSTAL SERVICE, Washington, DC (US)

(72) Inventors: Ryan Luckay, Reston, VA (US); Robert E. Dixon, Jr., Haymarket, VA (US); Heather Kelly, Alexandria, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 1094 days.

(21) Appl. No.: 17/127,404

(22) Filed: Dec. 18, 2020

(65) Prior Publication Data

US 2021/0192373 A1    Jun. 24, 2021

Related U.S. Application Data

(60) Provisional application No. 62/949,860, filed on Dec. 18, 2019.

(51) Int. Cl.
| | |
|---|---|
| *G06N 5/04* | (2023.01) |
| *G06N 20/00* | (2019.01) |
| *G06Q 10/0631* | (2023.01) |
| *G06Q 10/083* | (2024.01) |
| *G06Q 10/0833* | (2023.01) |
| *G06Q 10/109* | (2023.01) |

(Continued)

(52) U.S. Cl.
CPC ............ *G06N 5/04* (2013.01); *G06N 20/00* (2019.01); *G06Q 10/06312* (2013.01); *G06Q 10/0833* (2013.01); *G06Q 10/08355* (2013.01); *G06Q 10/0838* (2013.01); *G06Q 10/109* (2013.01); *G06Q 30/0201* (2013.01); *G06Q 30/016* (2013.01); *H04M 3/5183* (2013.01)

(58) Field of Classification Search
CPC .... G06N 5/04; G06N 20/00; G06Q 10/06312; G06Q 10/0631; G06Q 10/063; G06Q 10/06; G06Q 10/0833; G06Q 10/08355; G06Q 10/0835; G06Q 10/0838; G06Q 10/083; G06Q 10/08; G06Q 10/109; G06Q 10/10; G06Q 30/0201; G06Q 30/02; G06Q 30/016; G06Q 30/015; H04M 3/5183; H04M 3/51; H04M 3/50
USPC ......................................................... 706/12
See application file for complete search history.

(56) References Cited

U.S. PATENT DOCUMENTS

| | | | | |
|---|---|---|---|---|
| 10,003,508 B1* | 6/2018 | Cogan | ................... | H04L 41/16 |
| 2003/0037009 A1* | 2/2003 | Tobin | ................... | G06Q 20/367 |
| | | | | 705/65 |

(Continued)

OTHER PUBLICATIONS

IPCOM000225342D, "Notification of Unintended Physical Location Shipment Selection", Feb. 12, 2013. (Year: 2013).*

*Primary Examiner* — Hwei-Min Lu
(74) *Attorney, Agent, or Firm* — MH2 Technology Law Group, LLP (57) ABSTRACT

A computer-implemented method includes monitoring analytics data for a delivery item; accessing a user profile for a user associated with the delivery item; detecting the occurrence of an event trigger based on the analytics data and the user profile; and executing a proactive mitigating action based on detecting the occurrence of the event trigger. Associated systems and computer program products are also described.

19 Claims, 4 Drawing Sheets

(51) Int. Cl.
*G06Q 30/016* (2023.01)
*G06Q 30/0201* (2023.01)
*H04M 3/51* (2006.01)

(56) References Cited

U.S. PATENT DOCUMENTS

| | | | | |
|---|---|---|---|---|
| 2008/0004995 | A1* | 1/2008 | Klingenberg | G06Q 10/0832 705/28 |
| 2009/0281929 | A1* | 11/2009 | Boitet | G06Q 10/08 705/28 |
| 2010/0324959 | A1* | 12/2010 | Templeton | G06Q 10/08 705/14.1 |
| 2013/0325739 | A1* | 12/2013 | Asay | G06Q 10/0833 705/333 |
| 2014/0324725 | A1* | 10/2014 | Edmonds | G06Q 10/0835 705/333 |
| 2015/0039347 | A1* | 2/2015 | Sharma | G06Q 10/0833 705/4 |
| 2015/0046365 | A1* | 2/2015 | Zamer | G06Q 10/0838 705/341 |
| 2015/0066798 | A1* | 3/2015 | Gillen | G06Q 10/0835 705/336 |
| 2015/0170098 | A1* | 6/2015 | Glasgow | G06Q 10/0834 705/334 |
| 2018/0121875 | A1* | 5/2018 | Satyanarayana Rao | G06Q 10/08355 |
| 2018/0121878 | A1* | 5/2018 | Bostick | G06Q 10/08355 |
| 2018/0349844 | A1* | 12/2018 | Bounasser | G06Q 10/0833 |
| 2020/0162612 | A1* | 5/2020 | Mullane | G06Q 30/0281 |
| 2020/0267126 | A1* | 8/2020 | Beye | G06Q 10/08355 |

\* cited by examiner

DETERMINING AND EXECUTING PROACTIVE DELIVERY ACTIONS USING ARTIFICIAL INTELLIGENCE

CROSS-REFERENCE TO RELATED APPLICATIONS

This application claims the benefit of and priority to U.S. Provisional Patent Application 62/949,860, which was filed on Dec. 18, 2019, and is incorporated herein by reference in its entirety.

BACKGROUND

Package delivery service providers, (such as the United States Postal Service (USPS), United Parcel Service company (UPS), Federal Express company (FedEX), and the like), maintain customer service systems to provide information and services to package delivery customers (e.g., senders and recipients). Example customer service systems may include web-based tracking information systems, and call centers whereby customers may speak with live customer service representatives for obtaining information and other package delivery related services. For example, a customer may speak with a live customer service representative to receive tracking information for a package (i.e., any item that is being delivered), re-route a package to a different delivery destination, reschedule delivery, modify shipment speed, or modify a service associated with package delivery.

SUMMARY

In one example aspect a computer-implemented method includes monitoring analytics data for a delivery item; accessing a user profile for a user associated with the delivery item; detecting the occurrence of an event trigger based on the analytics data and the user profile; and executing a proactive mitigating action based on detecting the occurrence of the event trigger. Associated systems and computer program products are also described.

In another example aspect, a computer program product includes a computer readable storage medium having program instructions embodied therewith. The program instructions are executable by a computing device to cause the computing device to perform operations including: building a user profile linking a delivery-related action that a user has taken for a delivery item with a set of values from analytics data associated with the delivery item; detecting an occurrence of an event trigger based on values from analytics data of an in-transit delivery item matching the set of values from the user profile, and executing a proactive mitigating action after detecting the occurrence of the event trigger.

In another example aspect, a system includes a computer readable memory device including program instructions; a processor, operably connected to the computer readable memory device, that executes the program instructions to perform operations comprising: building a user profile linking a delivery-related action that a user has taken for a delivery item with a set of values from analytics data associated with the delivery item; monitoring analytics data for a delivery item in transit; detecting an occurrence of an event trigger based on values from analytics data of an in-transit delivery item matching the set of values from the user profile; and executing a proactive mitigating action after detecting the occurrence of the event trigger.

DETAILED DESCRIPTION

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Item or package delivery service providers may host customer service call centers whereby customers may speak with live customer service representatives for obtaining information and other package delivery related services, such as rescheduling the delivery of an item or package. The use of live customer service representatives is costly, and may require an extended period of wait time for a customer to reach a live customer service representative, depending on the call volume and number of representatives. This causes inefficient use of resources, including the resources used for missed package deliveries that the recipient customers fail to timely reschedule via live customer service representatives, whether due to wait times or other causes associated with customer service call centers.

As noted, redelivery efforts for missed package deliveries are inefficient, burdensome, and costly for a package delivery service provider, including the technical inefficiencies and costs associated with increased sorting machinery usage, increased computer and memory usage, increased delivery vehicle usage, increased call center bandwidth usage, and the like. Accordingly, aspects of the present disclosure may include embodiments that may automatically generate a proactive action(s) that reduces the volume of live customer service activity, including the activity associated with scheduling redeliveries. Additionally, or alternatively, the embodiments described herein may reduce missed delivery attempts and redeliveries by proactively modifying a delivery based on conditions and/or analytics data associated with the delivery.

As one illustrative example, the embodiments of systems and/or methods, described herein, may proactively reschedule the delivery of a delivery item (e.g., a package) based on analytics information indicating that a recipient of the package is unavailable to receive the delivery. Additionally, or alternatively, the systems and/or methods may proactively reschedule or redirect a delivery based on historical user profile information indicating that the recipient has a previous pattern of rescheduling or redirecting delivery under certain conditions (e.g., weather conditions on a day of delivery, day of the week of the delivery, time of day of the delivery, based on the recipient's work schedule, etc.). In some embodiments, changes in delivery estimates (e.g., a delay in delivery or an early delivery) may trigger a proactive mitigating action. In various implementations, rescheduling the delivery of an item may include cancelling the originally scheduled delivery attempt before the attempt occurs, and replacing it with a different, newly scheduled delivery attempt based on attributes such as the various data as described herein.

In general, the embodiments of systems and/or methods, described herein, may utilize advanced analytics systems henceforth summarized in the term "artificial intelligence", leveraging historical data stored in a user profile, and/or rules engines to automatically generate and execute mitigating actions based on package analytics data. As described herein, the proactive mitigating actions may reduce call volume to a call center and the associated usage of call center technical resources, reduce missed deliveries and the associated usage of delivery-related technical resources, and/or improve customer satisfaction. In some embodiments, aspects of the present disclosure may provide a user (e.g., a sender and/or recipient) with an automated system to confirm, deny, or modify an auto-generated proactive action (e.g., confirm, deny, or modify a redelivery instruction, etc.). One who is skilled in the art of artificial intelligence systems will be able to identify other relevant techniques, but these systems could include but are not limited to web-based systems, chatbots, text messaging services. These may be used to notify a user about an auto-generated mitigating action to be proactively taken (e.g., the rescheduling of a delivery). Such systems may also be used to allow the user to confirm, deny, or modify the auto-generated mitigating action. In some embodiments, there may also be partial or fully automated help desk processes in place to support customers.

In some embodiments, a user profile may be generated, updated, and maintained over time. The user profile may include information that may be used to calculate, predict, or determine proactive actions that can be taken in response to package analytics data relating to a package delivery. As described herein, the building of a user profile for a user may involve tracking and storing information regarding the user's calling activity into a call center, the details of calls made to the call center, missed delivery activity, package delivery rescheduling activity, package delivery rerouting activity, the conditions under which package delivery has been missed, rescheduled, and/or rerouted, and the like. In some embodiments, artificial intelligence may be implemented to estimate, interpolate, or determine one or more portions of the user profile based on the user profiles of other similar users.

In some embodiments, a proactive mitigation system may access a user profile, monitor package analytics data, and implement artificial intelligence to detect an event that triggers the generation of a proactive action based on the package analytics data and the user profile. Example package analytics data may include information identifying the sender, the recipient, weather conditions along a delivery route of the package, estimated delivery day of the week, estimated delivery time of day, declared value of the package, contents of the package (if shared by the sender), delays or changes in expected delivery, or the like. The user profile may identify the package analytics data or the conditions under which a package delivery has been missed, rescheduled, and/or rerouted. In various implementations, proactive measures and mitigating actions may be taken (e.g., to reschedule a delivery, reroute a delivery, notify the recipient, etc.) based on the package analytics data. Further, the best-suited proactive mitigating action may be taken for the specific user based on the user's user profile indicating the delivery actions the user has taken previously under certain conditions.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

Figure 1:
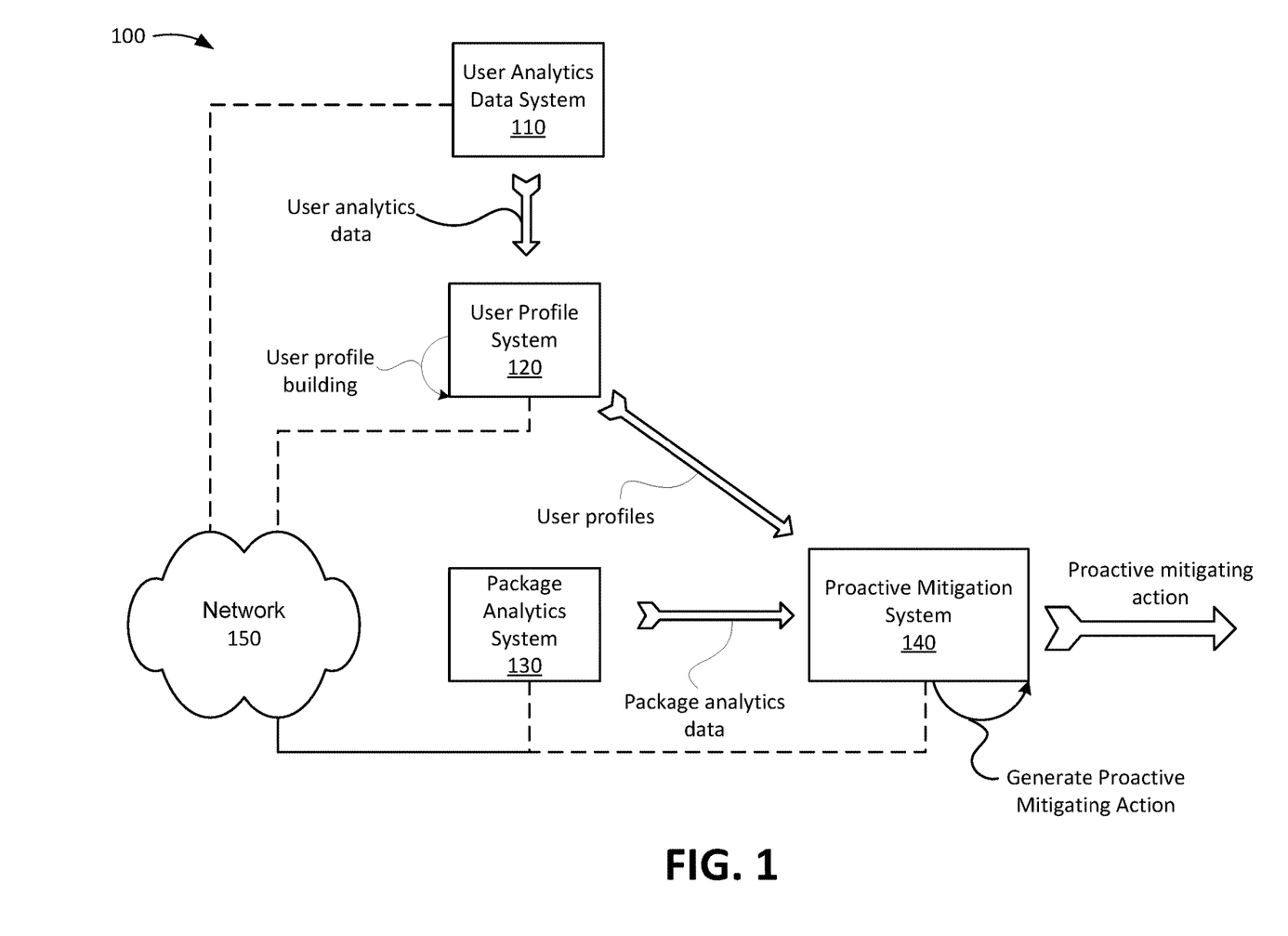
FIG. 1 shows an overview of an example implementation and an example network for determining and executing delivery actions using artificial intelligence in accordance with aspects of the present disclosure.

FIG. 1 shows an overview of an example implementation and an example network 150 for determining and executing delivery actions using artificial intelligence in accordance with aspects of the present disclosure. As shown in FIG. 1, environment 100 may include a user analytics data system 110, a user profile system 120, a package analytics system 130, a proactive mitigation system 140, and a network 150.

The user analytics data system 110 may include one or more computing device and/or database system that gathers, processes and/or stores a variety of user analytics data pertaining to users and their behaviors relating to item delivery or package delivery activity. In some embodiments, example user analytics data may include a user's calling activity into a call center, the details of calls made to the call center (e.g., the length of the call, purpose of the call, actions taken as a result of the call, etc.), missed delivery activity, package delivery rescheduling activity, package delivery rerouting activity, conditions under which package delivery has been missed, rescheduled, and/or rerouted, etc. Additionally, or alternatively, the user analytics data may include the user's work schedule, shopping history, location history, and/or any other data that may pertain to package delivery services or behaviors associated with package delivery services. As shown in FIG. 1, the user analytics data system 110 may provide user analytics data to a user profile system 120. In some embodiments, the user analytics data system 110 may append a user identifier to a set of user analytics data provided to the user profile system 120.

The user profile system 120 may include one or more computing device that receives user analytics data from the user analytics data system 110, and builds and maintains user profiles for different users over a period of time. For example, the user profile system 120 may build, maintain, and update a user profile for a particular user by obtaining, tracking, and storing user analytics data associated with the user. In various embodiments, the user profile may store information that identifies delivery actions that the user has historically or previously taken under a certain set of conditions. That is, the user profile may store information linking delivery-related actions with a set of values associated with the package analytics data under which those delivery-related actions were taken by that user. For example, the user profile may store (e.g., in a data structure) a set of values relating to the user analytics information that identifies calls to a call center that the user previously made, the purpose of the calls, the conditions under which the calls were made, and delivery actions (e.g., the user's instructions regarding how and when to deliver or redeliver a package) that were taken via the call, or via a web-based system (e.g., delivery actions to reroute/redeliver/reschedule package delivery, track package information, change package delivery speed, etc.). Additionally, or alternatively, the user profile may store information relating to missed deliveries for the user, and the conditions of the missed delivery (e.g., time of day of the missed delivery, day of the week, weather conditions, etc.).

As one illustrative example, the user profile may store information indicating or identifying that the user has historically or previously rescheduled delivery under a set of conditions (e.g., on a certain day of the week or at a certain time of day, when the package is delayed, when the package has a declared value exceeding a certain threshold, when the package is being delivered in inclement weather, etc.). As another illustrative example, the user profile may store information indicating or identifying that the user has historically called in to a customer service center to reroute delivery, e.g., to a different address, under a certain set of conditions (e.g., when the package delivery estimate is updated to a sooner than originally expected date or time, when the declared value exceeds a threshold, etc.). As another example, the user profile may store information indicating or identifying that the user has historically changed delivery options for outgoing packages (e.g., to require a signature of the recipient) under a certain set of conditions (e.g., when the declared value of the package exceeds a threshold, when the package is sent to a particular recipient, when the package has a particular contents, etc.). In some embodiments, the user profile may store any other combination of delivery actions and conditions associated with delivery actions. As shown in FIG. 1, the user profile system 120 may provide user profiles or data from user profiles to the proactive mitigation system 140.

The package analytics system 130 may include one or more computing device that stores, processes, and tracks package analytics data, such as package tracking information, estimated delivery dates/times for a package, package delivery speed, package delivery services (e.g., express service, priority service, first-class service, etc.), package delivery options, declared package values, declared package contents, sender information, recipient information, etc. Additionally, or alternatively, the package analytics system 130 may gather, determine, process, and track other package analytics data, such as weather information along a delivery route, package delivery estimate updates (e.g., early or delayed deliveries), etc. As shown in FIG. 1, the package analytics system 130 may provide the package analytics data to the proactive mitigation system 140.

The proactive mitigation system 140 may include one or more computing device that receives or obtains user profiles from the user profile system 120 and package analytics data from the package analytics system 130. In some embodiments, the proactive mitigation system 140 may monitor or process the package analytics data, and automatically generate a proactive mitigating action when it detects or determines the occurrence of a triggering event. As described herein, the determination of the triggering event and the proactive mitigating action may be based on the user profile information and the package analytics data. As one illustrative example, the proactive mitigation system 140 may detect or determine that a triggering event has occurred when the delivery of the package is delayed or will be delayed (e.g., as determined or indicated by the package analytics data). Based on user profile information indicating that the recipient calls a customer service call center when package delivery is delayed, the proactive mitigation system 140 may automatically select, initiate, determine, or generate an appropriate mitigating action, and may proactively execute the mitigating action. In this example, the mitigating action may be to send the recipient a message (e.g., an e-mail, text message, automated phone call, etc.) advising the recipient of the delay in delivery. Because he or she has been proactively notified of the delayed delivery, the recipient is less likely to call the call center, thus reducing resource usage, call volume, and the like. As noted previously, the proactive mitigation system 140 may determine the appropriate mitigating action to be action that is the same or similar to an action that has been taken in the past by the user while in the same or a similar situation, as indicated or connoted in the user's user profile information.

As another example, the proactive mitigation system 140 may analyze the package analytics data and determine that an event trigger has occurred because the package analytics information/data indicates that the package is scheduled to be delivered early (e.g., at 2:00 pm) to the user's home address, and user profile information indicates that the recipient typically is at work, rather than at home, at the early delivery time. The proactive mitigation system 140 may then analyze the user profile data and determine that, in the past, the user has typically rerouted packages to the user's work location when the packages are scheduled to be delivered before 5:30 pm. Based on the delivery time information and the user's past actions, the proactive mitigation system 140 may then generate or initiate a mitigating instruction to proactively reroute the package delivery to a different location (i.e., to the recipient's work location in this example). In this way, the likelihood of a missed delivery is decreased, which decreases the usage of sorting resources, computer resources, vehicle resources, bandwidth resources, and the like on missed deliveries.

As another example, the proactive mitigation system 140 may generate a proactive mitigating instruction to change a delivery option to require a signature based on the package analytics data indicating a declared value exceeding a threshold, and user profile information indicating that the sender typically requires a signature when the declared value exceeds the threshold. In this way, a call to a customer service call center that would have otherwise been placed to change the delivery option may be avoided. As another example, the proactive mitigation system 140 may generate a proactive mitigating instruction to reschedule delivery, or reroute delivery to a different location during inclement weather and when the user profile indicates that the recipient or sender has previously rescheduled or rerouted delivery during inclement weather. As another example, the proactive mitigation system 140 may generate a proactive mitigating instruction to reroute a delivery based on the recipient rerouting a different delivery. Additionally, or alternatively, the proactive mitigating instruction may be based on any combination or variety of rules and criteria based on information stored in the user profile and the package analytics data.

In some embodiments, the proactive mitigating instruction may extend beyond delivery-related actions. For example, the processes performed by the proactive mitigation system 140 may be applied to other types of systems as well, such as ordering and/or shopping systems. As an illustrative example, the proactive mitigation system 140 may generate a proactive mitigating instruction to place an order for an item for a user based on the user's shopping history indicating that the user has historically placed an order for the item at regular intervals.

As shown in FIG. 1, the proactive mitigation system 140 may output the proactive mitigating action for execution (e.g., to a package delivery system). In some embodiments, the proactive mitigation system 140 may provide a confirmation message to the user (e.g., via text message, e-mail message, web-based application, chatbot, etc.), and the user may confirm, modify, or cancel the proactive mitigating action. By predicting a user's actions in the context of package delivery and by proactively executing predicted mitigating actions, technical resources are used more efficiently with reduced waste, the level of call center volume may be reduced, and the number of missed delivery attempts may be reduced. Further, customer satisfaction and other advantages may be realized as a result of proactively executing mitigating actions as described herein.

As further shown in FIG. 1, the user analytics data system 110, the user profile system 120, the package analytics system 130, and the proactive mitigation system 140 may communicate via a network 150. The network 150 may include network nodes and one or more wired and/or wireless networks. For example, the network 150 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 150 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 150 may include copper transmission cables, optical transmission fibers, wireless transmission, routers, firewalls, switches, gateway computers and/or edge servers.

The quantity of devices and/or networks in the environment 100 is not limited to what is shown in FIG. 1. In practice, the environment 100 may include additional devices and/or networks; fewer devices and/or networks; different devices and/or networks; or differently arranged devices and/or networks than illustrated in FIG. 1. Also, in some implementations, one or more of the devices of the environment 100 may perform one or more functions described as being performed by another one or more of the devices of the environment 100; e.g., the functions may all be performed by a single device. Devices of the environment 100 may interconnect via wired connections, wireless connections, or a combination of wired and wireless connections.

Figure 2:
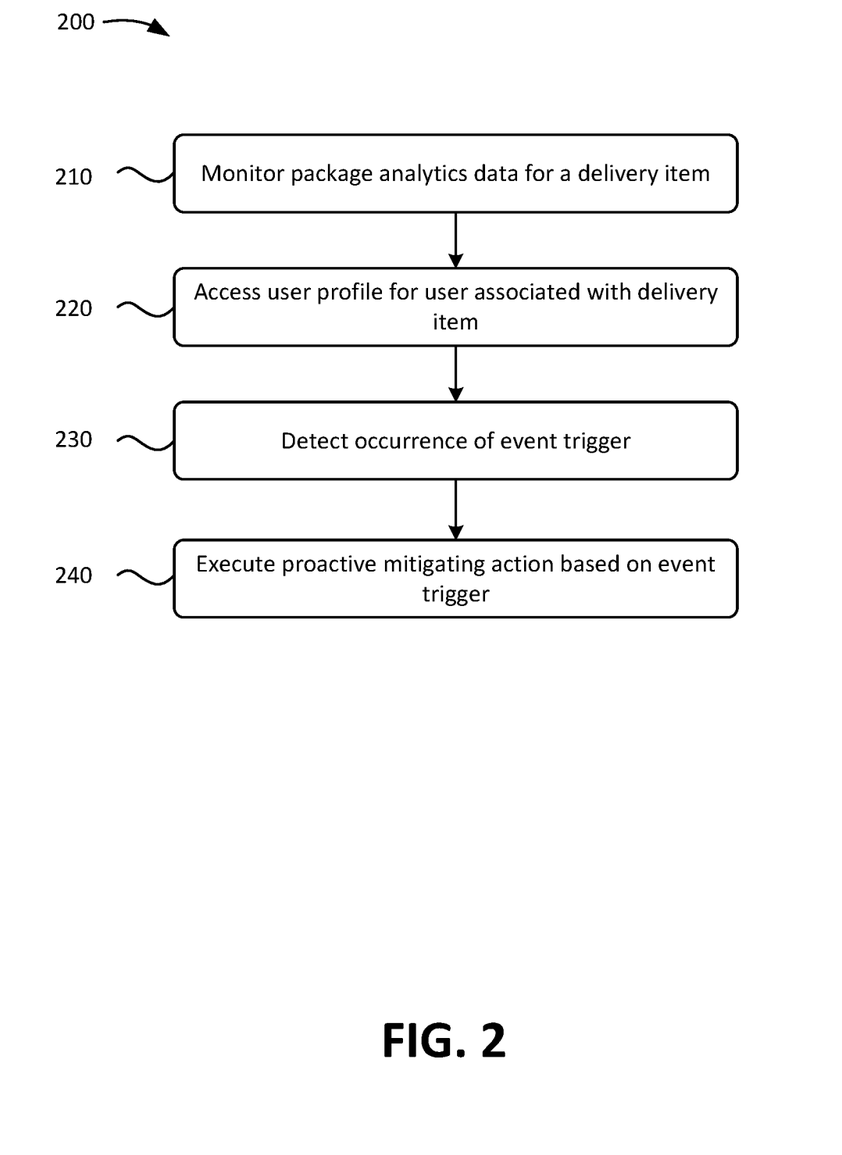
FIG. 2 shows an example flowchart of a process for executing a proactive mitigating action based on the occurrence of an event trigger.

FIG. 2 shows a flowchart of an example of a process 200 for executing a proactive mitigating action based on the occurrence of an event trigger. The operations of FIG. 2 may be implemented in the environment of FIG. 1, for example, and are described using reference numbers of elements depicted in FIG. 1. As noted above, the flowchart illustrates the architecture, functionality, and operation of possible implementations of systems, methods, and computer program products according to various embodiments of the present disclosure.

As shown in FIG. 2, process 200 may include monitoring and/or analyzing the package analytics data for a delivery item (block 210). For example, the proactive mitigation system 140 may monitor package analytics data (e.g., received or obtained from the package analytics system 130) for a delivery item (e.g., package) currently in transit to a destination. As described above, the package analytics data for a delivery item may include information/data indicating the sender, the recipient, the location of the package (e.g., arrived at Post Office, Fairfax, VA) at a specific time, the current status of the package (e.g., in transit), weather conditions along a delivery route of the package, estimated delivery day of the week, estimated delivery time of day, declared value of the package, contents of the package (if shared by the sender), delays or changes in expected delivery, or the like.

Process 200 may also include accessing a user profile (e.g., obtaining information from a user profile) associated with the delivery item (block 220). For example, the proactive mitigation system 140 may access a user profile received or obtained from the user profile system 120. In some embodiments, the proactive mitigation system 140 may access a user profile associated with the sender, recipient, or other party associated with the delivery item, where one or more of these parties may be specified in the package analytics data. As described herein, the user profile may identify or specify one or more conditions under which a package delivery previously has been missed, rescheduled, and/or rerouted by the user associated with the user profile. Additionally, or alternatively, the user profile may identify delivery-related actions the user has taken previously under certain conditions. That is, the user profile may store information linking delivery-related actions with the package analytics data under which those delivery-related actions were taken.

Process 200 may further include detecting the occurrence of an event trigger (block 230). For example, the proactive mitigation system 140 may detect or determine the occurrence of an event trigger that indicates that a proactive mitigating action should be taken. In various implementations, in general, the proactive mitigation system 140 may detect or determine that an event trigger has occurred by: 1) processing and/or analyzing the information for a specific package from the package analytics data that it is monitoring (from block 210), for example, to extract or form a candidate set of data values that may (or may not) warrant or be a reason for taking a mitigating action, 2) comparing the candidate set of data values to corresponding set of data values from the user profile (from block 220) to see if the data value(s) match, and 3) if the trigger value do match, what, if any, action the user took in the past when the trigger conditions occurred.

Thus, in various embodiments, the proactive mitigation system 140 may detect or determine whether or not a trigger event has occurred based on information stored within a data structure that identifies the actions a user has previously or historically taken (e.g., as shown in the user profile) based on a set of package analytics data values that define or are associated with the event trigger. That is, an event trigger occurrence may be detected when a set of package analytics data values match the data values from the user profile (e.g., package analytics data values that were previously stored in the user profile) that define the event trigger; i.e., the data values from the user profile that have caused the user to take an action in the past.

As one illustrative example, the proactive mitigation system 140 may detect or determine that an event trigger has occurred based on: 1) the package analytics data indicating that the delivery of a package is expected to be delayed, and 2) the user profile data indicating that the intended recipient of the package has a history of calling in to a customer call center when package deliveries have been delayed.

As another illustrative example, the proactive mitigation system 140 may detect that an event trigger has occurred based on: 1) the package analytics data indicating that both: a) the delivery of a package is scheduled during inclement weather, and b) the declared value of the package exceeds a threshold; and 2) the user profile data indicating that the recipient of the package has historically called the customer call center to modify delivery actions when both a) and b) have occurred in the past—for example, the recipient may have historically called the customer call center to modify the delivery actions to require a signature upon delivery and to reroute the delivery of a package to an alternate location (e.g., the recipients place of employment).

As another illustrative example, the proactive mitigation system 140 may detect or determine that an event trigger has occurred based on: 1) the package analytics data indicating that a package is in route to be delivered to the user at their home address, and 2) the user profile indicating that both: a) the user's location is away from a home location (e.g., when the user is on vacation), and b) that the user has historically had packages held by the delivery system until the user's location is once again the home location (e.g., when the user returns from vacation).

The proactive mitigation system 140 may detect the occurrence of other event triggers based on any variety of package analytics data and user profile data, and the event triggers may be different for each user, depending in part on how they have acted in the past under certain delivery conditions, as reflected in the package analytics data. Thus, for different users, each having different user profile data, the same set of package analytics data values may be a trigger event for some users, but not be a trigger event for other users. Thus, in various implementations, the set of conditions or circumstances (e.g., the trigger event as represented by the information in the package analytics data) that results in a mitigating action for one user may result in no trigger, and no mitigating action for a different user. Similarly, the set of circumstances (e.g., the trigger event) that cause the system 140 to execute a certain mitigating action for one user can cause the system 140 to execute a different mitigating action for another user, even though set of circumstances is the same (e.g., the trigger event).

Process 200 may also include executing a proactive mitigating action based on the event trigger (block 240). For example, if the proactive mitigation system 140 detects or identifies an event trigger in the package analytics data (e.g., at block 230), then the system 140 may identify, lookup, or otherwise determine a proactive mitigating action(s) corresponding to the event trigger that was detected, and then proactively initiate or execute those mitigating action(s). As described herein for some implementations, the proactive mitigation system 140 may identify, select, or determine a particular proactive mitigating action(s) from among a group of proactive mitigating actions based on information stored in a data structure that maps the proactive mitigating action to the event trigger and the package analytics data. In various such implementations, the detected event trigger and the package analytics data for that specific package may be used to look up the appropriate mitigating action(s), where the mitigating action(s) are modeled on what the associated user (e.g., the recipient) has done in the past under the same or similar conditions per the user's analytics data.

That is, different package analytics data values may define or correspond to different types of event triggers and different proactive mitigating actions to be taken. Also, for different users, each having different user profile data, the same set of analytics data values may map to a different proactive mitigating action. That is, the mitigating action taken for one user under a certain set of conditions or circumstances (e.g., a certain trigger event) can be different from the mitigating action taken for another user under the same set of circumstances (e.g., in response to the same trigger event). In this way, the proactive mitigation system 140 may select the best-suited or appropriate proactive mitigating action for each specific user based on that user's user profile, which identifies actions the user has previously taken under a certain set of conditions.

As noted, in various embodiments, the proactive mitigation system 140 may initiate, put into effect, or execute the appropriate proactive mitigating action(s) for the user (e.g., a package delivery related action which may correspond to an action that the user has previously taken in the same or a similar situation or under the same or similar conditions or circumstances, as represented by a given set of package analytics data). As described herein, examples of proactive mitigating actions may include rescheduling delivery of the package, redirecting or rerouting delivery of the package, modifying a delivery option of the package (e.g., signature confirmation, etc.), modifying a delivery or shipping speed of the package, providing the user with a message or notification, etc., or any combination of these. In some embodiments, the proactive mitigating action may also be or include sending a notification to the user indicating that a proactive action is being taken, or sending a notification or message having information that reduces the likelihood of the user calling in to a call center (e.g., a message notifying the user that a package delivery is delayed, which reduces the likelihood of the user calling in to a call center to inquire about the status of the delivery). Additionally, or alternatively, the proactive mitigation system 140 may output a confirmation or inquiry message to the user to provide the user with an opportunity to confirm, modify, or deny the proactive mitigating action that the system plans to implement. In this way, the user can control whether or not the system enacts the proactive mitigating action before the mitigating action occurs or is completed, as the user may prefer a different action than the action the system selects based on the user's user profile, which indicates the delivery actions the user has taken previously under certain conditions.

Figure 3:
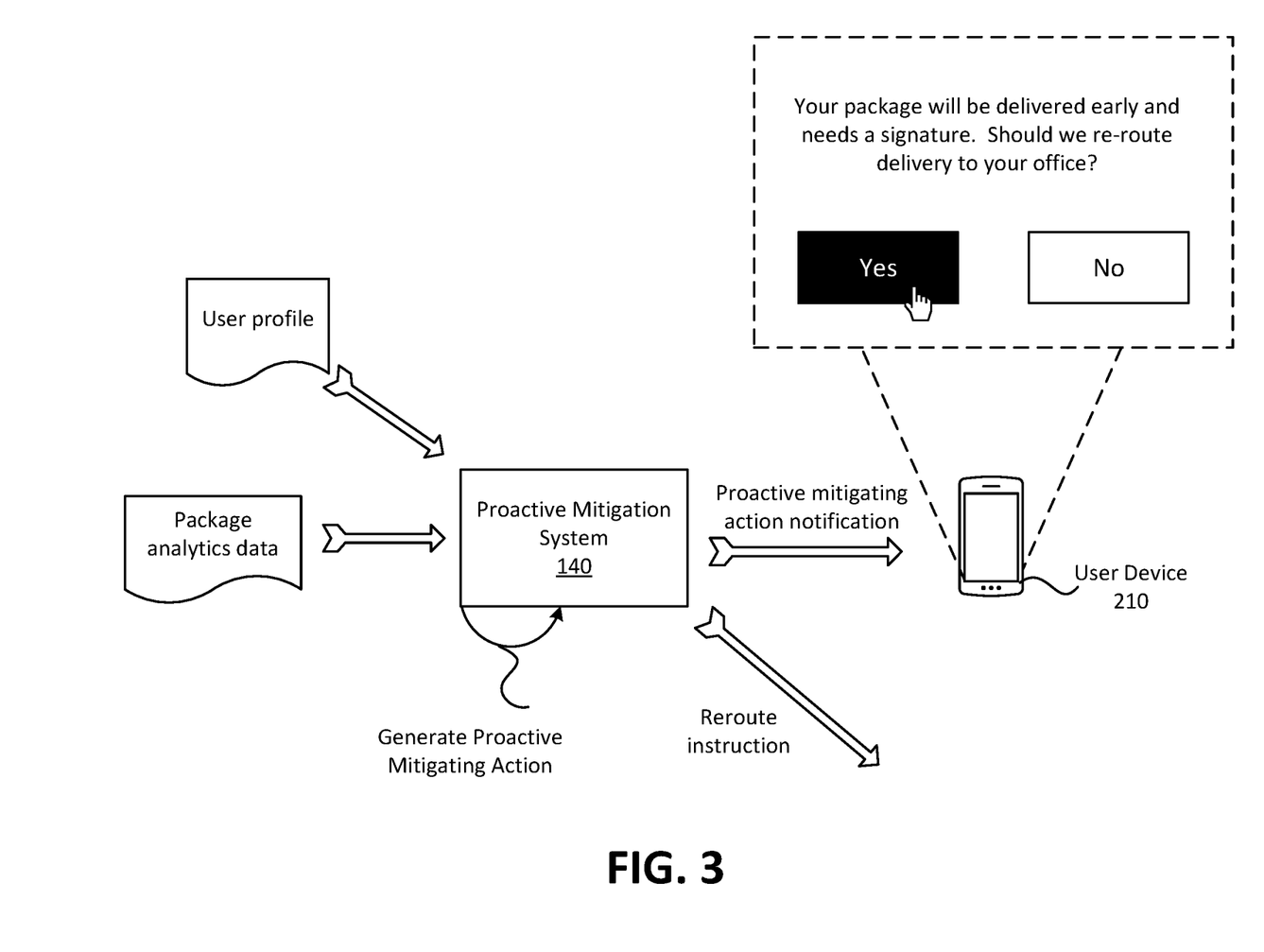
FIG. 3 illustrates an example implementation for generating and executing a proactive mitigating instruction based on user profile data and package analytics data.

FIG. 3 illustrates an example implementation for generating and executing a proactive mitigating instruction based on user profile data and package analytics data. As shown FIG. 3, the proactive mitigation system 140 may receive a user profile (e.g., from the user profile system 120) and package analytics data (e.g., from the package analytics system 130). In some embodiments, the proactive mitigation system 140 may generate a proactive mitigating action based on the user profile and the package analytics data (e.g., in accordance with process 200 as described in FIG. 2). As an illustrative example, the proactive mitigation system 140 may determine, based on the package analytics data, that a package is anticipated to be delivered earlier in the day than originally scheduled, and that the package requires a signature for release. The proactive mitigation system 140 may also determine, based on the user profile data, that a user (e.g., a recipient) of the package has previously rerouted delivery of the package to the user's office location (e.g., rather than the user's residence) when the package is delivered earlier in the day. Accordingly, the proactive mitigation system 140 may generate a proactive mitigating action to reroute the package to the user's office. As further shown in FIG. 3, the proactive mitigation system 140 may provide a notification of the proactive mitigating action to a user device 210 associated with the user (e.g., recipient). Based on receiving the proactive mitigating action notification, the user device 210 may display the proactive mitigating action whereby the user may confirm or deny or proactive mitigating action (e.g., by providing user input or a selection via the user device 210). That is, before executing a proactive mitigating action, the proactive mitigation system 140 may provide a notification of the proactive mitigating action to a user device 210, and may not take action until receiving user input via the user device 210 to confirm or modify the proactive mitigating action.

In the example shown in FIG. 3, the user device 210 receives an input or selection to accept the proactive mitigating action (e.g., to reroute the package). Accordingly, the proactive mitigation system 140 outputs a rerouting instruction (e.g., to a package delivery system) to execute the package rerouting. In this way, the proactive mitigation system 140 may proactively modify delivery instructions based on the user's history and profile indicating actions the user has previously taken. As such, the chances of a missed delivery are reduced, and the likelihood that the user may call in to the call center (e.g., to reschedule a missed delivery) is reduced.

Figure 4:
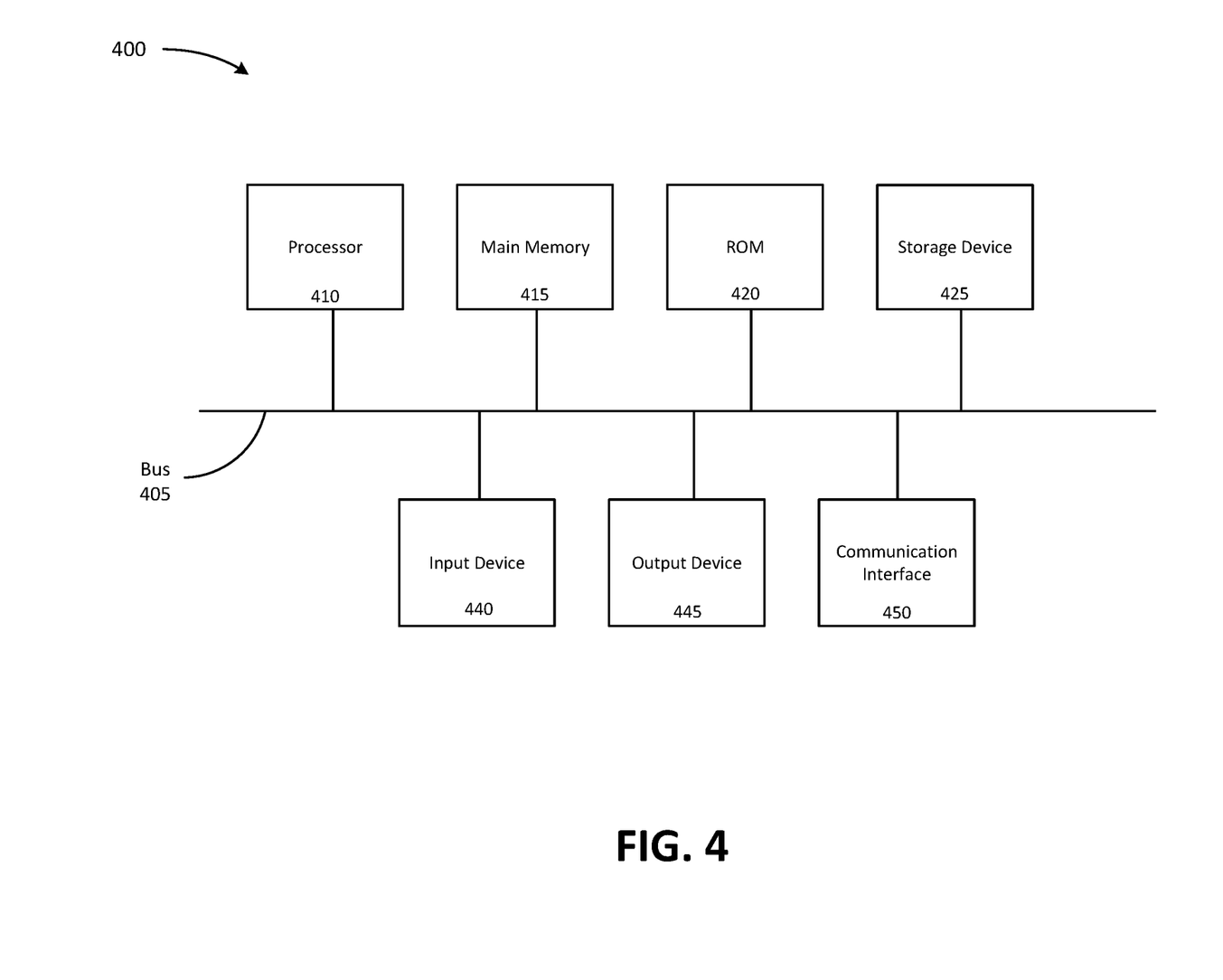
FIG. 4 illustrates example components of a device that may be used within environment of FIG. 1.

FIG. 4 illustrates example components of a device 400 that may be used within environment 100 of FIG. 1. Device 400 may correspond to the user analytics data system 110, user profile system 120, package analytics system 130, proactive mitigation system 140, and/or the user device 210. Each of the user analytics data system 110, user profile system 120, package analytics system 130, proactive mitigation system 140, and/or the user device 210 may include one or more devices 400 and/or one or more components of device 400.

As shown in FIG. 4, device 400 may include a bus 405, a processor 410, a main memory 415, a read only memory (ROM) 420, a storage device 425, an input device 440, an output device 445, and a communication interface 450.

Bus 405 may include a path that permits communication among the components of device 400. Processor 410 may include a processor, a microprocessor, an application specific integrated circuit (ASIC), a field programmable gate array (FPGA), or another type of processor that interprets and executes instructions. Main memory 415 may include a random-access memory (RAM) or another type of dynamic storage device that stores information or instructions for execution by processor 410. ROM 420 may include a ROM device or another type of static storage device that stores static information or instructions for use by processor 410. Storage device 425 may include a magnetic storage medium, such as a hard disk drive, or a removable memory, such as a flash memory.

Input device 440 may include a component that permits an operator to input information to device 400, such as a control button, a keyboard, a keypad, or another type of input device. Output device 445 may include a component that outputs information to the operator, such as a light emitting diode (LED), a display, or another type of output device. Communication interface 450 may include any transceiver-like component that enables device 400 to communicate with other devices or networks. In some implementations, communication interface 450 may include a wireless interface, a wired interface, or a combination of a wireless interface and a wired interface. In embodiments, communication interface 450 may receiver computer readable program instructions from a network and may forward the computer readable program instructions for storage in a computer readable storage medium (e.g., storage device 425).

Device 400 may perform certain operations, as described in detail below. Device 400 may perform these operations in response to processor 410 executing software instructions contained in a computer-readable medium, such as main memory 415. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 415 from another computer-readable medium, such as storage device 425, or from another device via communication interface 450. The software instructions contained in main memory 415 may direct processor 410 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 400 may include additional components, fewer components, different components, or differently arranged components than are shown in FIG. 4.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
    monitoring analytics data for a delivery item, wherein the delivery item comprises a package sent to a user;
    accessing a user profile for the user, wherein the user profile links a previous delivery-related action that the user has previously taken for a previous delivery item with a set of past values of analytics data associated with the previous delivery item, wherein the previous delivery-related action comprises the user previously calling in to a customer service center;
    detecting an occurrence of an event trigger based on the analytics data for the delivery item and the user profile, wherein the user profile comprises information identifying one or more delivery-related actions that the user has previously taken in association with the occurrence of the event trigger, wherein the detecting the occurrence of the event trigger comprises detecting that a location of the user is away from a home location, whereby a predicted user action of the user is determined, wherein the predicted user action comprises a prediction that the user will call in to the customer service center;
    executing a proactive mitigating action based on detecting the occurrence of the event trigger, wherein the proactive mitigating action comprises:
    modifying a delivery speed for the delivery item;
    before executing the proactive mitigating action, providing a notification identifying the proactive mitigating action to the user; and
    receiving, from the user, input confirming the proactive mitigating action, wherein the executing the proactive mitigating action is performed in response to receiving the input confirming the proactive mitigating action.

2. The method of claim 1, wherein the detecting the occurrence of the event trigger further comprises at least one of:
    detecting a change in a date or time estimate of delivery of the delivery item;

detecting a particular weather condition at an expected time of package delivery, or along a delivery route of the delivery item;

identifying that a declared value of the delivery item exceeds a threshold.

3. The method of claim 1, wherein the analytics data for the delivery item includes at least one of:
data indicating a sender of the delivery item;
data indicating a recipient of the delivery item;
data indicating an expected delivery date and time of the delivery item;
data indicating a weather condition along a delivery route of the delivery item;
data indicating a declared value of the delivery item;
data indicating declared contents of the delivery item;
data indicating tracking information of the delivery item;
data indicating a delivery option of the delivery item;
data indicating a delivery service of the delivery item; or
data indicating the delivery speed of the delivery item.

4. The method of claim 1, further comprising building the user profile over time by tracking and storing information identifying one or more delivery-related actions that the user has previously taken under a set of conditions corresponding to information in the analytics data for the delivery item.

5. The method of claim 1, further comprising determining a second proactive mitigating action among a group of proactive mitigating actions based on values of the analytics data for the delivery item.

6. The method of claim 1,
wherein the analytics data for the delivery item indicates that the delivery item is in route to be delivered to the home location, and
wherein the previous delivery-related action that the user has previously taken for the previous delivery item further comprises having the previous delivery item held until the location of the user is the home location.

7. The method of claim 1, wherein the detecting that the location of the user is away from the home location comprises detecting that the user is on vacation.

8. A computer program product comprising a computer readable storage medium having program instructions embodied therewith, the program instructions executable by a computing device to cause the computing device to perform operations comprising:
building a user profile linking a previous delivery-related action that a user has previously taken for a previous delivery item with a set of past values from analytics data associated with the previous delivery item, wherein the previous delivery-related action comprises the user previously calling in to a customer service center;
detecting an occurrence of an event trigger based on candidate values from analytics data of an in-transit delivery item matching the set of past values from the analytics data associated with the previous delivery item from the user profile, wherein the user profile comprises information identifying one or more delivery-related actions that the user has previously taken in association with the occurrence of the event trigger, wherein the detecting the occurrence of the event trigger comprises detecting that a location of the user is away from a home location, whereby a predicted user action of the user is determined, wherein the predicted user action comprises a prediction that the user will call in to the customer service center, wherein the in-transit delivery item comprises a package sent to the user;

executing a proactive mitigating action after detecting the occurrence of the event trigger, wherein the proactive mitigating action comprises at least one of:
modifying a delivery speed for the in-transit delivery item;
before executing the proactive mitigating action, providing a notification identifying the proactive mitigating action to the user; and
receiving, from the user, input confirming the proactive mitigating action, wherein the executing the proactive mitigating action is performed in response to receiving the input confirming the proactive mitigating action.

9. The computer program product of claim 8, wherein the previous delivery-related action comprises at least one of:
rerouting the previous delivery item;
rescheduling delivery of the previous delivery item;
modifying a shipping speed of the previous delivery item; or
modifying delivery options of the previous delivery item.

10. The computer program product of claim 8, wherein the analytics data of the in-transit delivery item includes at least one of:
data indicating a sender of the in-transit delivery item;
data indicating a recipient of the in-transit delivery item;
data indicating an expected delivery date and time of the in-transit delivery item;
data indicating a weather condition along a delivery route of the in-transit delivery item;
data indicating a declared value of the in-transit delivery item;
data indicating declared contents of the in-transit delivery item;
data indicating tracking information of the in-transit delivery item;
data indicating a delivery option of the in-transit delivery item;
data indicating a delivery service of the in-transit delivery item; or
data indicating the delivery speed of the in-transit delivery item.

11. The computer program product of claim 8, wherein the detecting the occurrence of the event trigger further comprises at least one of:
detecting a change in a date or time estimate of delivery of the in-transit delivery item;
detecting a particular weather condition at an expected time of package delivery, or along a delivery route of the in-transit delivery item;
identifying that a declared value of the in-transit delivery item exceeds a threshold.

12. The computer program product of claim 8,
wherein the analytics data for the in-transit delivery item indicates that the in-transit delivery item is in route to be delivered to the home location, and
wherein the previous delivery-related action that the user has previously taken for the previous delivery item further comprises having the previous delivery item held until the location of the user is the home location.

13. The computer program product of claim 8, wherein the detecting that the location of the user is away from the home location comprises detecting that the user is on vacation.

14. A system comprising:
a computer readable memory device including program instructions;

a processor, operably connected to the computer readable memory device, that executes the program instructions to perform operations comprising:

building a user profile linking a previous delivery-related action that a user has previously taken for a previous delivery item with a set of past values from analytics data associated with the previous delivery item, wherein the previous delivery-related action comprises the user previously calling in to a customer service center;

monitoring analytics data for a delivery item in transit, wherein the delivery item in transit comprises a package sent to the user;

detecting an occurrence of an event trigger based on candidate values from the analytics data of the in-transit delivery item matching the set of past values from the analytics data associated with the previous delivery item from the user profile, wherein the user profile comprises information identifying one or more delivery-related actions that the user has previously taken in association with the occurrence of the event trigger, wherein the detecting the occurrence of the event trigger comprises detecting that a location of the user is away from a home location, whereby a predicted user action of the user is determined, wherein the predicted user action comprises a prediction that the user will call in to the customer service center;

executing a proactive mitigating action after detecting the occurrence of the event trigger, wherein the proactive mitigating action comprises:
modifying a delivery speed or a delivery service for the in-transit delivery item;

before executing the proactive mitigating action, providing a notification identifying the proactive mitigating action to the user; and receiving, from the user, input confirming the proactive mitigating action, wherein the executing the proactive mitigating action is performed in response to receiving the input confirming the proactive mitigating action.

15. The system of claim 14, wherein the detecting the occurrence of the event trigger further comprises at least one of:

detecting a change in a date or time estimate of delivery of the delivery item in transit;

detecting a particular weather condition at an expected time of package delivery, or along a delivery route of the delivery item in transit;

identifying that a declared value of the delivery item in transit exceeds a threshold.

16. The system of claim 14, wherein the analytics data for the delivery item in transit includes at least one of:

data indicating a sender of the delivery item in transit;
data indicating a recipient of the delivery item in transit;
data indicating an expected delivery date and time of the delivery item in transit;
data indicating a weather condition along a delivery route of the delivery item in transit;
data indicating a declared value of the delivery item in transit;
data indicating declared contents of the delivery item in transit;
data indicating tracking information of the delivery item in transit;
data indicating a delivery option of the delivery item in transit;
data indicating a delivery service of the delivery item in transit; or
data indicating the delivery speed of the delivery item in transit.

17. The system of claim 14, wherein the operations further comprise determining a second proactive mitigating action among a group of proactive mitigating actions based on the candidate values from the analytics data of the in-transit delivery item.

18. The system of claim 14,
wherein the analytics data for the delivery item in transit indicates that the delivery item in transit is in route to be delivered to the home location, and
wherein the previous delivery-related action that the user has previously taken for the previous delivery item further comprises having the previous delivery item held until the location of the user is the home location.

19. The system of claim 14, wherein the detecting that the location of the user is away from the home location comprises detecting that the user is on vacation.

* * * * *